United States Patent Office 3,036,806
Patented May 29, 1962

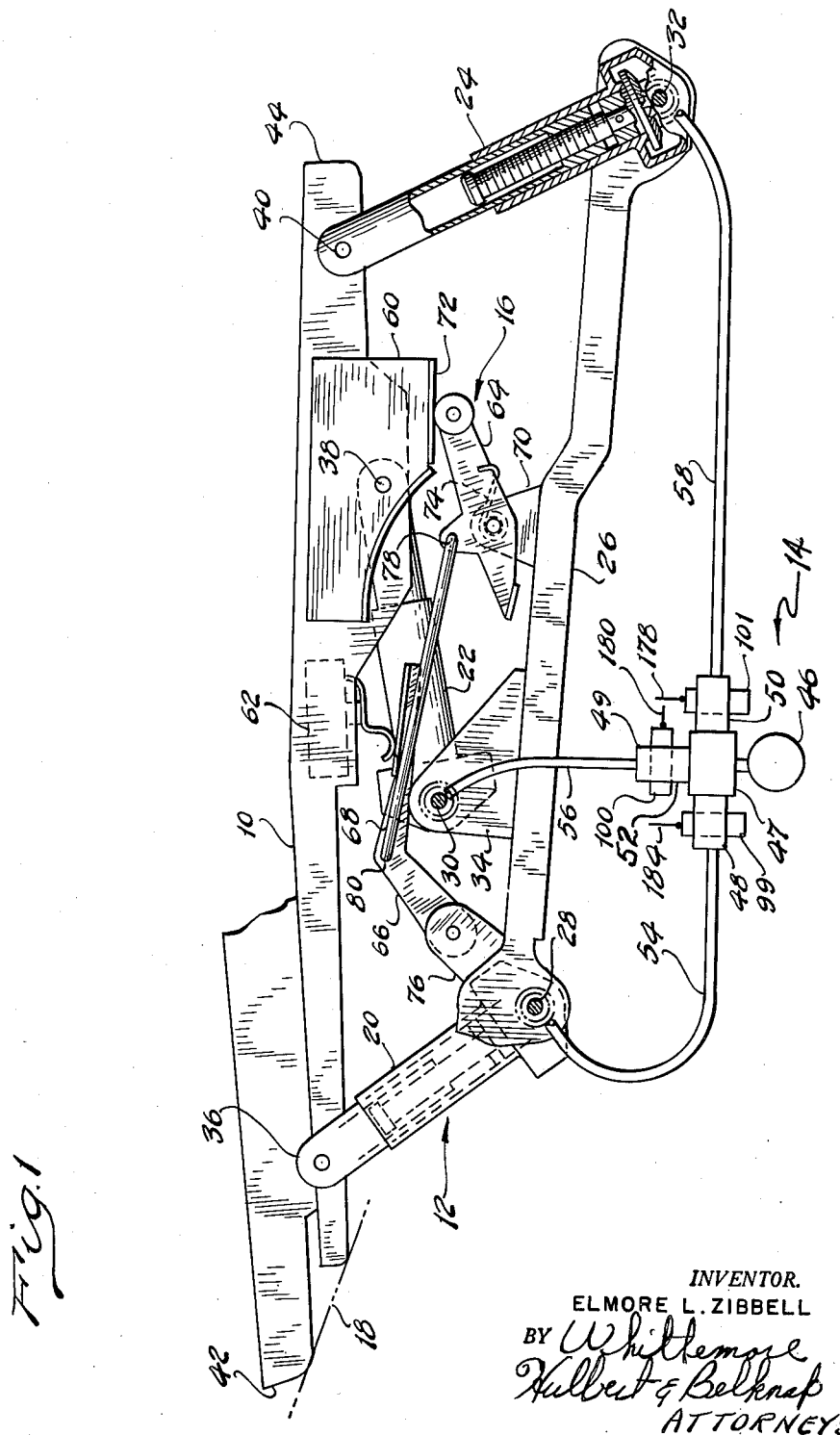

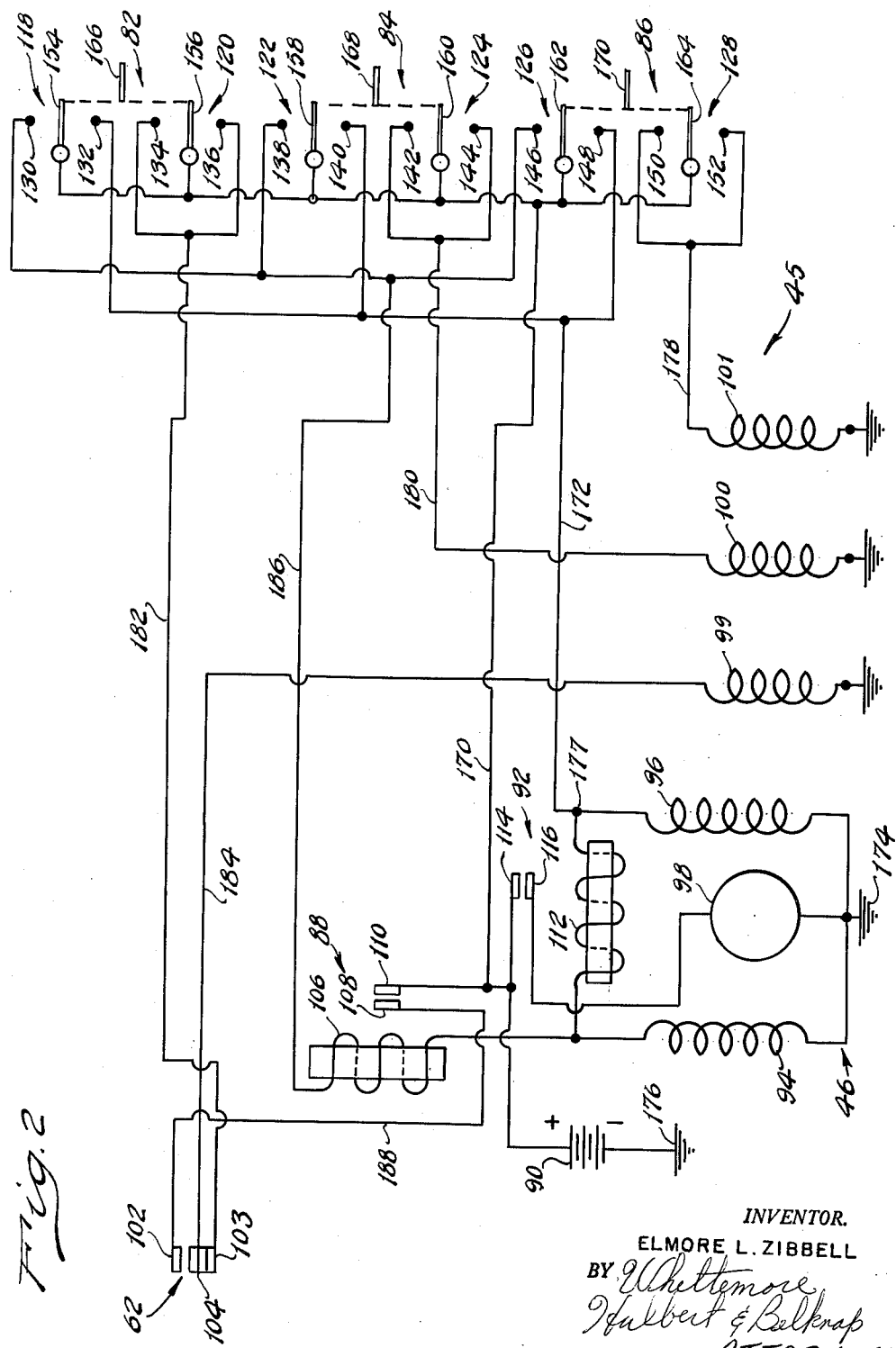

3,036,806
SEAT ADJUSTING MECHANISM
Elmore L. Zibbell, Redford, Mich., assignor to Ferro Stamping Company, Detroit, Mich., a corporation of Michigan
Filed Dec. 29, 1958, Ser. No. 783,452
13 Claims. (Cl. 248—393)

The present invention relates to a seat adjusting mechanism and refers more particularly to a driven seat adjusting mechanism providing substantially universal adjustment of the seat in two dimensions and including automatic means to prevent the seat from coming into contact with obstructions during adjustment thereof.

At the present time the trend in automotive design is to vehicles characterized by minimum over-all height. The lowering of the over-all height of automobiles has necessarily brought portions of the floor into close proximity with the seat frame. This is particularly true in the vicinity of the drive shaft where the seat frame and floor may be separated by a very small distance. This presents serious problems in the multiple adjustment of the seats which is also common at the present time. During the adjustment of the seat it may come in contact with the floor causing wear on the floor, possible jamming of the seat adjusting mechanism and possible pinching of fingers or toes and crushing of objects placed between the floor and seat of the automobile.

Therefore it is one of the objects of the present invention to provide a seat adjusting mechanism including means to prevent the seat from coming into contact with obstructions during adjustment thereof.

Another object is to provide a seat adjusting mechanism for automobile seats including means to prevent the seat from coming into contact with the floor or extensions of the floor of the automobile during adjustment thereof.

More specifically it is an object to provide seat supporting mechanism for automobile seats capable of substantially universal adjustment in two dimensions, means to adjust the supporting mechanism, and means to limit the adjustment of the supporting mechanism in one direction in each of the two dimensions to prevent the seat from contacting obstructions while being adjusted.

Still more specifically it is an object of the present invention to provide seat supporting mechanism for automobile seats capable of substantially universal adjustment in two dimensions, including extensible links pivotally attached between the seat and a fixed support, means to adjust the extensible links including an electrical control system, a drive motor and individual clutches, and means to limit the adjustment of the supporting mechanism in one direction in each of the two dimensions to prevent the seat from contacting obstructions while being adjusted including a limit switch in the control system, a control cam attached to the seat and means to operate the limit switch in response to movement of the control cam.

Other objects and features of the invention will become apparent as the description proceeds, especially when taken in conjunction with the accompanying drawings, illustrating a preferred embodiment of the invention, wherein:

FIGURE 1 is a side view of a seat adjusting mechanism according to the invention.

FIGURE 2 is a schematic diagram of the electrical control system of the seat adjusting mechanism of FIGURE 1.

The invention as illustrated in the figures is a seat adjusting mechanism comprising adjustable seat supporting means, means to adjust the seat supporting means, including an electrical control system, and means to prevent the seat from coming into contact with obstructions such as the floor of the automobile while being adjusted.

With particular reference to FIGURE 1, an embodiment of the seat adjusting mechanism of the invention will be described. In FIGURE 1, the seat contruction comprises the frame 10, supporting means 12 for the seat construction and power adjusting means for the seat supporting means indicated generally at 14. Means collectively designated 16 are provided to prevent the seat from contacting obstructions such as the portion 18 of the floor of the automobile. When supporting means 12 for seat 10 is adjusted with adjusting means 14 the seat is prevented from contacting the floor 18 of the automobile by means 16.

Seat support means 12 includes three extensible links 20, 22 and 24 located at each end of seat frame 10. Only one set of the extensible links are shown in the side view of the seat adjusting mechanism shown in FIGURE 1. The extensible links 20, 22 and 24 as shown have their lower ends pivotally connected to a fixed support 26 by pivot means 28, 30 and 32, respectively. Fixed support 26 may also be the floor of the automobile or may be a separate member secured to the floor of the automobile in any known manner such as by welding. Bracket 34 is attached to support 26 by convenient means to provide a support for pivot means 30 as shown. The upper ends of extensible links 20, 22 and 24 are pivotally connected to the seat frame 10 by pivot means 36, 38 and 40 as indicated in FIGURE 1.

With the extensible links 20, 22 and 24 pivotally mounted as shown substantially universal movement of seat frame 10 in two dimensions may be accomplished. Extension or retraction of extensible link 20 will raise or lower the front 42 of the seat frame 10. Extension or retraction of extensible link 24 will raise or lower the rear 44 of the seat frame 10. Simultaneous extension or retraction of both extensible links 22, 24 will raise or lower the seat frame 10 without tilting thereof. The seat frame 10 is moved backward and forward by extension of the extensible link 22. When extensible links 20, 22 and 24 are not being adjusted the seat frame 10 is supported rigidly in a fixed position thereby.

Extensible links 20, 22 and 24 may be of any desired type capable of rigidly supporting seat frame 10, of being adjusted to different lengths by a reversibly rotatable member such as a flexible cable and having means for pivotal mounting at both ends. Such an extensible link is particularly described in applicant's copending application Serial Number 726,738, filed April 7, 1958, and will not therefore be considered in detail herein.

The adjusting means 14 for the seat supporting means 12 as shown includes a single electrical control circuit 45 shown in FIGURE 2 which will be discussed in detail later, a reversible electric drive motor 46 with associated drive means 47 and electrically operated clutches 48, 50 and 52, each having one side connected to drive motor 46 through drive means 47. Drive means 47 may be any suitable arrangement capable of producing rotary motion of three shafts set in different directions from one rotating shaft. Many such means are well known and will not therefore be discussed herein. Flexible drive cables 54, 56 and 58 connect the other side of clutches 48, 50 and 52 in driving relation to extensible links 20, 22 and 24 respectively. A single set of three clutches may be used with a single drive motor and proper cable connections to adjust the extensible links on both sides of seat frame 10. In operation drive motor 46 is rotated clockwise or counterclockwise and clutches 48, 50 and 52 are selectively actuated to retract or extend extensible links 20, 22 and 24 causing seat frame 10 to be adjusted. The energizing of motor 46 to cause it to rotate in a particular direction and the engagement of selected ones of clutches 48, 50 and 52 is accomplished by means of particular switches in control circuit 45 to be discussed later.

The means 16 to prevent the seat frame 10 from contacting the automobile floor 18 during adjustment of the seat frame includes control cam 60 secured to seat frame 10, limit switch 62 also secured to seat frame 10, and means to control the operation of limit switch 62 in accordance with the movement of control cam 60 comprising control arm 64, switch actuating arm 66 and connecting link 68 between control arm 64 and switch actuating arm 66.

Control arm 64 shaped as shown is pivotally mounted on an extension of fixed support 26 or bracket 70 and has one end thereof resiliently held in contact with cam surface 72 of control cam 60 by spring 74. Switch actuating arm 66 also formed as shown is pivotally attached at one end to an extension of fixed support 26 or bracket 76. The other end of switch actuating arm 66 is positioned as shown to engage or disengage limit switch 62 on pivoting of arm 66 to cause limit switch 62 to be closed or opened. Connecting link 68 is pivotally attached at one end to control arm 64 at point 78 and at the other end to point 80 on control arm 66 as shown. Connecting link 68 serves to transfer any pivotal movement of control arm 64 to switch actuating arm 66.

From the arrangement of arms 64 and 66 and link 68 it can be seen that if control 64 is pivoted clockwise switch actuating arm 66 will also be pivoted clockwise and will tend to open limit switch 62 and when arm 64 is pivoted counterclockwise arm 66 tends to close limit switch 62. According to the embodiment of the invention illustrated in FIGURE 1 the size, shape and position of control cam 60, cam surface 72, control arm 64, switch actuating arm 66, connecting link 68 and limit switch 62 is such that at any time seat frame 10 is in a position where contact with floor 18 is imminent, limit switch 62 will be closed by arm 66. With a particular relationship selected for the members 64, 66, 68 and 62 control cam 60 and particularly cam surface 72 may be designed by trial or other well known methods so that switch 62 will be closed only at the desired times by causing control arm 64 to pivot due to its end following cam surface 72 and thereby causing pivoting of switch actuating arm 66.

Limit switch 62 which is shown attached to seat 10 in FIGURE 1 is included in control circuit 45 illustrated in FIGURE 2. Closing limit switch 62 prevents seat frame 10 from contacting floor 18 by causing the extensible link 20 to be extended if the cause of the imminent contact is the extension of extensible link 24 or the retraction of extensible link 22. If retraction of extensible link 20 is about to cause contact between seat frame 10 and floor 18 closing limit switch 62 stops the retraction of the extensible link 20. The exact circuitry by which these results are obtained through the closing of limit switch 62 will be considered in connection with control circuit 45.

In FIGURE 2 control circuit 45 is shown schematically. The control circuit as shown includes three sets of switches generally indicated 82, 84 and 86, limit switch 62, limit control relay 88, battery 90, motor relay 92, field windings 94 and 96 for motor 46, armature 98 for motor 46 and solenoids 99, 100 and 101 for engaging clutches 48, 50 and 52 connected as shown. Limit switch 62 comprises stationary contacts 102 and 103 and movable contact 104. Limit control relay 88 includes solenoid 106 and contacts 108 and 110. Motor relay 92 includes solenoid 112 and contacts 114 and 116.

Each of switch sets 82, 84 and 86 includes two separate switches 118 and 120, 122 and 124, and 126 and 128 respectively. Switches 118, 120, 122, 124, 126 and 128 have contacts 130 and 132, 134 and 136, 138 and 140, 142 and 144, 146 and 148, and 150 and 152 respectively as shown. Switches 118, 120, 122, 124, 126 and 128 also include pivoted switch arms 154, 156, 158, 160, 162 and 164 respectively, all arranged as shown. Switch arms 154 and 156, arms 158 and 160, and arms 162 and 164 are preferably ganged together in pairs as indicated for operation by a single toggle switch 166, 168 and 170 respectively for each of switch sets 82, 84 and 86.

The three toggle switches 166, 168 and 170 may be conveniently located in the automobile for adjustment of seat frame 10. Toggle switches 166, 168 and 170 are of the type which may be held up or down to complete a circuit or circuits and which automatically assume a neutral position breaking all circuits made thereby on being released.

The complete operation of the seat adjusting mechanism may best be explained by first referring to FIGURE 2 and considering the operation of the control system and its effect on the adjusting means 16 and supporting means 14 of FIGURE 1 in various circumstances.

First assume that it is desired to lower the rear 44 of seat frame 10. Toggle switch 170 is held down causing switch arms 162 and 164 to connect with contacts 148 and 152 of switches 126 and 128 respectively. Connection of switch arm 162 with contact 148 allows current from battery 90 to pass along conductor 170, through switch arm 162 and contact 148, along conductor 172, through motor field winding 96, and motor relay solenoid 112 and motor field winding 94 to ground connection 174 and subsequently back to the ground connection 176 of battery 90 in a complete electrical circuit. The resistance to current flow of motor relay solenoid 112 in comparison to the resistance to current flow of motor field windings 94 and 96 is such that as the current from conductor 172 divides at point 177 between the two parallel paths to ground 174 formed by motor relay solenoid 112 with field winding 94 and field winding 96 a much larger current will flow through field winding 96 to ground than will flow through solenoid 112 and field winding 94.

Current flowing in motor relay solenoid 112 causes relay contacts 114 and 116 to connect with each other. Connection of relay contacts 114 and 116 causes current to flow from battery 90, through motor relay contacts 114 and 116, through motor armature 98 to ground 174 and subsequently back to battery 90 through ground connection 176 in a complete electrical circuit.

Current flowing in motor armature 98 and the current flowing in motor field winding 96 simutaneously will cause motor 46 to rotate in a direction to cause extensible links 20 and 24 to be retracted and extensible link 22 to extend providing clutches 48, 50 and 52 are engaged. The small amount of current flowing through field winding 94 at this time is insufficient to affect the direction of rotation of motor 46.

Connection of switch arm 164 with contact 152 of switch 128 by holding toggle switch 170 down allows current to flow from battery 90, along conductor 170, through switch arm 164 and contact 152, along conductor 178 through clutch solenoid 101 of clutch 52 to ground and back to battery 90 through ground connection 176. Clutch 50 is caused to be engaged by current flowing in solenoid 101. With motor 46 rotating in the proper direction and clutch 52 engaged extensible link 24 is caused to retract thereby lowering the rear of seat 44 as desired. It will be noted that the lowering of the rear of seat 44 has been accomplished by merely holding toggle switch 170 in the down position. When extensible link 24 has been fully retracted motor 46 is caused to stall as is common in seat adjusting assemblies.

It will also be noted that in lowering the rear of seat frame 10 it is impossible to cause the front of seat frame 10 to contact floor 18. Therefore as seat frame 10 is lowered control cam 60 is also lowered causing control arm 64 to rotate clockwise which through connecting link 68 causes switch actuating arm 66 to rotate clockwise out of engagement with limit switch 62. Thus limit switch 62 is never closed by lowering the rear of seat frame 10.

Moving the seat frame 10 backwards by extending extensible link 22 may be accomplished in a similar manner.

Holding toggle switch 168 down causes switch arms 158 and 160 to connect with contacts 140 and 144 respectively. Connecting switch arm 160 with contact 144 of switch 124 causes solenoid 100 of clutch 52 to be energized by battery 90 through conductor 180 in a manner similar to that in which solenoid 101 is energized by holding down toggle switch 170 as previously described. Similarly connecting contact 140 with switch arm 158 energizes motor 46 in the manner previously described to cause rotation of the motor in a direction extending extensible screw 22.

Thus with motor 46 energized and clutch 52 engaged by solenoid 101 the seat frame 10 may be caused to move backwards. Backwards movement of frame 10 it will be noted is accomplished by merely holding down toggle switch 168. Furthermore as seat frame 10 moves backwards switch actuating arm 66 is prevented from closing limit switch 62 by the particular configuration of cam surface 72 of control cam 60 in conjunction with control arm 64 and connecting link 68.

Lowering the front 42 of seat frame 10 may similarly be accomplished by holding toggle switch 166 down. Motor 46 is energized by thus causing switch arm 154 to connect with contact 132 of switch 118 in the manner previously explained in connection with the lowering of the rear of seat 10 and moving it backwards. Solenoid 99 is energized to cause clutch 48 to engage drive means 47 when switch arm 156 makes connection with contact 136 of switch 120. Solenoid 99 is energized through conductor 182, limit switch contacts 103 and 104 and conductor 184.

With solenoid 99 and motor 46 energized as previously explained to cause extensible link 20 to retract front 42 of seat frame 10 will be lowered. The relation between control cam 60, control arm 64, connecting link 68, switch actuating arm 66 and limit switch 62 is such that when seat frame 10 is lowered to the point where contact with floor line 18 is imminent limit switch 62 is closed. Closing limit switch 62 separates contacts 103 and 104 thereof. Separating contacts 103 and 104 of limit switch 62 causes solenoid 99 to be deenergized and clutch 48 to be disengaged thereby halting the downward movement of the front of seat frame 10 and preventing contact between floor 18 and seat frame 10. With limit switch 62 closed holding down toggle switch 166 will cause no further movement of seat frame 10. Thus it can be seen that the front of seat frame 10 may also be lowered as far as it is desirable to do so by merely holding down toggle switch 166.

Assume now that it is desired to raise the front of seat frame 10. To do this it is necessary to energize motor 46 so that it will rotate in the opposite direction to its rotation in the above discussions and to energize solenoid 99 to cause clutch 48 to engage. This is accomplished by holding toggle switch 166 in the up position. Holding toggle switch 166 in the up position causes switch arms 154 and 156 of switches 118 and 120 to connect with contacts 130 and 134 respectively. The connection between switch arm 154 and contact 130 of switch 118 allows motor 46 to be energized by battery 90. The current path from battery 90 to energize motor 46 is through conductor 170, switch arm 154, contact 130, along conductor 186, through solenoid 106 of the limit control relay, and to ground 174 through the parallel paths consisting of motor field winding 94, and motor relay solenoid 112 and motor field winding 96 respectively.

It will be noted that in thus energizing motor 46 that motor relay solenoid 112 is now in series with motor field winding 96 with respect to the parallel current paths to ground rather than being in series with motor field winding 94 as it is when motor 46 is energized by passing current through conductor 172. The result of this circuit arrangement is that most of the current proceeding through the above mentioned parallel circuits when current is fed thereto through conductor 186 will pass through field winding 94 to ground 174 due to the larger resistance of the parallel path formed by motor relay solenoid 112 and motor field winding 96. The current flowing through motor field winding 94 will cause motor 46 to rotate in the opposite direction to that in which it rotated when a greater portion of the current passed through motor field winding 96. This reversal of rotation of motor 46 will cause extensible links 20 and 24 to be extended and extensible link 22 to be retracted when solenoids 99, 100 and 101 engage clutches 48, 50 and 52.

The connection between switch arm 156 of switch 120 and contact 134 thereof caused by holding toggle switch 166 in the up position allows clutch solenoid 99 to be energized by battery 90 through a path including conductor 182, contact 103 and contact 104 of limit switch 62 and conductor 184 when limit switch 62 is in the open position. Should limit switch 62 be in the closed position when toggle switch 166 is held up, clutch solenoid 99 will be energized by battery 90 over a path which includes contacts 110 and 108 of limit control relay 88 which are held closed by the energized relay solenoid 106 in the motor energizing circuit just described, conductor 188, contacts 102 and 104 of limit switch 62 and conductor 184.

Thus it can be seen that the front end 42 of seat frame 10 may be raised by extension of adjustable link 20 by merely holding toggle switch 166 in the up position. Since it is impossible for seat frame 10 to contact floor 18 due to extension of extensible link 20 the relation between control cam 60, control arm 64, limit switch actuating arm 66, extensible link 88 and limit switch 62, as shown, is such that limit switch 62 is never closed by holding toggle switch 166 in an up position.

Holding toggle switch 168 up will cause extensible link 22 to be retracted and therefore will move seat frame 10 forward. This is accomplished by moving switch arms 158 and 160 into contact with contacts 138 and 142 respectively, of switches 122 and 124. The connection between switch arm 160 and contact 142 allows clutch solenoid 100 to be energized by battery 90 over a path which includes conductors 170 and 180 in the manner previously described in connection with the movement of seat frame 10 backward by holding toggle switch 168 down.

The connection between switch arm 158 and contact 138 due to holding toggle switch 168 in the up position allows motor 46 to be energized in the same manner that it is when toggle switch 166 is held in the up position which has been previously described. The path for the current which energizes motor 46 with toggle switch 168 held in the up position includes limit control relay solenoid 106 which when energized closes limit control relay contacts 108 and 110.

Since it is possible to bring seat frame 10 into contact with floor 18 through retraction of extensible link 22 accomplished in the aforementioned manner, the relationship between control cam 60, control arm 64, extensible link 68, switch actuating arm 66 and limit switch 62 shown in FIGURE 1 is such that limit switch 62 will be closed when contact between the seat frame 10 and floor 18 is imminent. Closing of limit switch 62 causes clutch solenoid 99 to be energized by battery 90 through contacts 110 and 108 of the limit control relay conductor 188, contacts 102 and 104 of limit switch 62 and conductor 184. Energizing solenoid 99 engages clutch 48, thereby causing extensible link 20 to be extended. Extension of extensible link 20 raises the front end 42 of seat frame 10 thereby preventing contact between seat frame 10 and floor 18 as seat frame 10 is moved forward.

Toggle switch 170 is held up to extend extensible link 24 and thereby raise the rear of seat 44. Holding toggle switch 170 up connects switch arms 162 and 164 respectively to contacts 146 and 150 of switches 126 and 128. The connection between switch arm 164 and contact 150 energizes clutch solenoid 101 as previously described through conductor 170 and conductor 178. Likewise the connection between switch arm 162 and contact 146 energizes motor 46 through limit control relay solenoid 106 in the manner previously described.

It is also possible to cause seat frame 10 to contact floor 18 by the extension of extensible link 24 in the manner just described by holding toggle switch 170 in the up position. Therefore due to the relation of control cam 60 control arm 64, extensible link 68 and limit switch actuating arm 66, limit switch 62 is closed when contact between the seat frame 10 and the floor line 18 is imminent. The result of the closing of limit switch 62 is to energize clutch solenoid 99 with battery 90 through limit control relay contacts 110 and 108, conductor 188, limit switch contacts 102 and 104, and conductor 184, as previously described, which causes extensible link 20 to extend raising the front 42 of seat frame 10 thereby preventing contact between the front of seat frame 10 and floor line 18.

Thus it can be seen that substantially universal adjustment in two dimensions of seat frame 10 may be accomplished through the control of support means 12 by adjusting means 14. Toggle switch 166 may be held up to cause the front of seat frame 10 to raise or held down to cause the front thereof to lower. When toggle switch 168 is raised seat frame 10 moves forward and when switch 168 is lowered seat frame 10 moves backward. Toggle switch 170 when held up causes the rear of seat frame 10 to raise and when held down causes the rear of seat 10 to lower. Furthermore according to the invention limit switch 62 in relation with control cam 60, control arm 64, connecting link 68 and limit switch actuating arm 66 is operable so that it is impossible for seat frame 10 to come in contact with floor 18 during these adjustments.

Should seat frame 10 approach floor 18 so that contact between the two becomes imminent due to the forward adjustment of the seat frame 10 or the upward adjustment of the rear 44 of the seat frame the front of the seat is caused to be adjusted upward by operation of limit switch 62 to prevent such contact. The lowering of the front 42 of seat frame 10 is also limited by switch 62 to prevent contact between the floor 18 and seat frame 10.

Thus the possibility of jamming the seat adjusting mechanism, of pinching fingers or toes, or crushing objects placed between the floor or other obstruction and an adjustable seat during the adjustment of the seat is eliminated through the use of applicant's seat adjusting mechanism.

The drawings and the foregoing specification constitute a description of the improved seat adjusting mechanism in such full, clear, concise and exact terms as to enable any person skilled in the art to practice the invention, the scope of which is indicated by the appended claims.

What I claim as my invention is:

1. Seat positioning mechanism comprising adjustable support means for supporting a seat over a stationary base, including an extensible link pivotally attached at opposite ends to the front of said seat frame and said stationary base, adjusting means operably associated with said support means for adjusting said support means to position the seat, and means operably associated with the seat and adjusting means for preventing the front of the seat from contacting the stationary base during upward positioning of the rear of the seat without halting upward positioning of the rear of the seat, including means for causing said extensible link to extend.

2. Seat positioning mechanism comprising adjustable support means for supporting a seat over a stationary base, including an extensible link pivotally attached at opposite ends to the front of said seat frame and said stationary base, adjusting means operably associated with said support means for adjusting said support means to position the seat, and means operably associated with the seat and adjusting means for preventing the front of the seat from contacting the stationary base during the positioning of the seat in a forward direction and during the upward positioning of the rear of the seat without halting the positioning of the seat in the forward and upward directions, including means for causing said extensible link to extend.

3. Seat positioning mechanism comprising adjustable support means for supporting a seat over a stationary base, including an extensible link pivotally attached at opposite ends to the front of said seat frame and said stationary base, adjusting means operably associated with said support means for adjusting said support means to position the seat, and means operably associated with the seat and adjusting means for preventing the front of the seat from contacting the stationary base, including means operable to extend said extensible link when contact between the front of the seat and the base becomes imminent during the positioning of the seat in a forward direction and during the upward positioning of the rear of the seat without halting the positioning of the seat in the forward and upward directions, said last mentioned means also being operable to limit the retraction of said extensible link when contact between the front of the seat and the base becomes imminent during the lowering of the front of the seat.

4. Seat positioning mechanism comprising adjustable support means for supporting a seat over a stationary base, adjusting means operably associated with said support means for adjusting said support means to position the seat, including an electrical control circuit, and means associated with the seat and adjusting means for preventing the seat from contacting predetermined obstructions during positioning thereof in particular directions without halting the positioning of the seat, including a limit switch attached to the seat and connected in said electrical control circuit, a control cam also attached to said seat for movement therewith, and means secured to the stationary base operably associated with said control cam to operate said limit switch on approach of the front of the seat to a predetermined obstruction, said last mentioned means including a control arm pivotally attached to the base and resilient means biasing one end of said control arm into contact with said control cam for related movement therewith.

5. Seat positioning mechanism comprising adjustable support means for supporting a seat over a stationary base, adjusting means operably associated with said support means for adjusting said support means to position the seat, including an electrical control circuit, and means associated with the seat and adjusting means for preventing the seat from contacting predetermined obstructions during positioning thereof in particular directions without halting the positioning of the seat, including a limit switch attached to the seat and connected in said electrical control circuit, a control cam also attached to said seat for movement therewith, and means secured to the stationary base operably associated with said control cam to operate said limit switch on approach of the front of the seat to a predetermined obstruction, said last mentioned means including a control arm pivotally attached to the base, resilient means biasing one end of said control arm into contact with said control cam, a switch actuating arm having one end pivotally attached to the base and the other end in operable association with said limit switch, and a connecting link pivotally attached at one end to said control arm and at the other to said switch actuating arm, said resilient means being operable to pivot said control arm about the pivotal mounting of the control arm to maintain said one end of said control arm in contact with said control cam during positioning of the seat, said connecting link transferring the pivotal movement of said control arm to said switch actuating arm, the switch actuating arm operable on being pivoted a predetermined amount in relation to the position of the seat to operate said limit switch.

6. Seat positioning mechanism comprising adjustable support means for supporting a seat over a stationary base, adjusting means operably associated with said support means for adjusting said support means to position the seat, including an electrical control circuit, and means associated with the seat and adjusting means for preventing the seat from contacting predetermined obstructions during positioning thereof in a particular direction without halting the positioning of the seat, including a limit switch attached to the seat and connected in said electrical control circuit, a control cam also attached to said seat for movement therewith, and means secured to the stationary base operably associated with said control cam to operate said limit switch on approach of the front of the seat to an obstruction, said last mentioned means including a control arm pivotally attached to the base, resilient means biasing one end of said control arm into contact with said control cam, a switch actuating arm having one end pivotally attached to the base and the other end in operable association with said limit switch, and a connecting link pivotally attached at one end to said control arm and at the other to said switch actuating arm, said resilient means being operable to pivot said control arm about the pivotal mounting of the control arm to maintain said one end of said control arm in contact with said control cam during adjustment of the seat, said connecting link transferring the pivotal movement of said control arm to said switch actuating arm, the switch actuating arm operable on being pivoted a predetermined amount in relation to the position of the seat to operate said limit switch, said actuating arm being pivoted said predetermined amount at any time the seat closely approaches a predetermined obstruction due to the configuration of said control cam.

7. Seat positioning mechanism comprising adjustable support means for supporting a seat, adjusting means operably associated with said support means for adjusting said support means to position the seat including an electrical control circuit comprising a battery, a reversible motor, a plurality of clutch solenoids, a plurality of means to simultaneously connect said battery to said motor to cause rotation of said motor in a predetermined direction and to connect said battery to a selected one of said clutch solenoids, comprising a plurality of pairs of switches each operable by means of a single toggle switch to position the seat in a predetermined manner, and a limit switch connected in said control circuit between said battery and one of said plurality of clutch solenoids operable to energize and de-energize said one clutch solenoid in response to predetermined positions of the seat, and means associated with the seat and adjusting means for preventing the seat from contacting predetermined obstructions during positioning thereof in particular directions without halting the positioning of the seat.

8. Seat positioning mechanism comprising adjustable support means for supporting a seat over a stationary base, adjusting means operably associated with said support means for adjusting said support means to position the seat, including an electrical control circuit comprising a battery, a reversible motor, a plurality of clutches actuated by clutch solenoids, a plurality of means to simultaneously connect said battery to said motor to cause rotation of said motor in a predetermined direction and to connect said battery to a selected one of said clutch solenoids, and a limit switch connected in said control circuit between said battery and one of said plurality of clutch solenoids operable to energize and de-energize said one clutch solenoid in response to predetermined positions of the seat, and means associated with the seat and adjusting means for preventing the seat from contacting predetermined obstructions during positioning thereof in particular directions without halting the positioning of the seat, said last mentioned means including a control arm pivotally attached to the base, resilient means biasing one end of said control arm into contact with said control cam, a switch actuating arm having one end pivotally attached to the base and the other end in operable association with said limit switch, and a connecting link pivotally attached at one end to said control arm and at the other to said switch actuating arm, said resilient means being operable to pivot said control arm about the pivotal mounting of the control arm to maintain said one end of said control arm in contact with said control cam during adjustment of the seat, said connecting link transferring the pivotal movement of said control arm to said switch actuating arm, the switch actuating arm operable on being pivoted a predetermined amount in relation to the position of the seat to operate said limit switch.

9. Limit switch actuating structure adapted for use with a seat having seat positioning mechanism, said actuating structure comprising a control cam adapted to be attached to the seat for movement therewith, a control arm adapted to be pivotally attached to a fixed support, resilient means biasing one end of said control arm into contact with said control cam for related movement therewith, and means connecting the other end of said control arm with said limit switch.

10. Limit switch actuating structure as claimed in claim 9 wherein said means connecting the other end of said control arm with said limit switch comprises a switch actuating arm having one end pivotally attached to the fixed support and the other end in operable association with said limit switch, and a connecting link pivotally attached at one end to said control arm and at the other to said switch actuating arm, said resilient means being operable to pivot said control arm about the pivotal mounting of the control arm to maintain said one end of said control arm in contact with said control cam, said connecting link transferring the pivotal movement of said control arm to said switch actuating arm, the switch actuating arm operable on being pivoted a predetermined amount to operate said limit switch.

11. In association with seat positioning mechanism which seat positioning mechanism includes means for supporting a seat over a stationary base and adjusting means operably associated with the support means for adjusting the support means to position the seat, and including means associated with the seat and adjusting means for preventing the seat from contacting predetermined obstructions during positioning thereof in particular directions without halting the positioning of the seat including a limit switch attached to the seat and connected in an electrical control circuit; the limit switch actuating structure comprising, a control cam adapted to be attached to said seat for movement therewith, a control arm adapted to be pivotally attached to the base, resilient means biasing one end of said control arm into contact with said control cam for related movement therewith, a switch actuating arm having one end pivotally attached to the base and the other end in operable association with said limit switch, and a connecting link pivotally attached at one end to said control arm and at the other to said switch actuating arm, said resilient means being operable to pivot said control arm about the pivotal mounting of the control arm to maintain said one end of said control arm in contact with said control cam during positioning of the seat, said connecting link transferring the pivotal movement of said control arm to said switch actuating arm, the switch actuating arm operable on being pivoted a predetermined amount in relation to the position of the seat to operate the limit switch.

12. Seat positioning mechanism comprising adjustable support means for supporting a seat, adjusting means operably associated with said support means for adjusting said support means in a plurality of different directions to position the seat, and means associated with the seat and adjusting means for effecting movement of the seat in said directions to a predetermined distance from predetermined obstructions regardless of the direction of movement and path of approach of the seat toward the obstructions.

13. Seat positioning mechanism comprising adjustable support means for supporting a seat, adjusting means operably associated with said support means for adjusting said support means in horizontal and vertical directions to position the seat, and means associated with the seat and adjusting means for effecting movement of the seat in said directions to a predetermined distance from predetermined obstructions regardless of the direction of movement and path of approach of the seat toward the obstructions.

References Cited in the file of this patent

UNITED STATES PATENTS

| | | |
|---|---|---|
| 2,362,197 | Garrett | Nov. 7, 1944 |
| 2,809,688 | Brundage | Oct. 15, 1957 |
| 2,823,949 | Williams | Feb. 18, 1958 |
| 2,829,002 | Leavengood | Apr. 1, 1958 |
| 2,839,124 | Desmond | June 17, 1958 |
| 2,871,913 | Appleton | Feb. 3, 1959 |
| 2,939,513 | Leslie | June 7, 1960 |